United States Patent [19]
Blount et al.
[11] 3,736,573
[45] May 29, 1973

[54] RESISTOR SENSING BIT SWITCH

[75] Inventors: Frederick T. Blount, Wappingers Falls, N.Y.; Henry A. Geller, Richmond, Vt.; Richard D. Moore, Hopewell Junction, N.Y.; Howard Leung; Scott C. Lewis, both of Essex Junction, Vt.; Joseph M. Redmond, Philadelphia, Pa.

[73] Assignee: International Business Machines Corporation, Armonk, N.Y.

[22] Filed: Nov. 11, 1971

[21] Appl. No.: 197,910

[52] U.S. Cl. ......340/173 R, 340/173 FF, 340/172.5, 307/238
[51] Int. Cl. ............................................G11c 11/40
[58] Field of Search .......................340/172.5, 173 R, 340/173 FF; 307/238

[56] References Cited

UNITED STATES PATENTS 3,363,115 1/1968 Stephenson....................340/173 FF
3,617,772 11/1971 Tertec............................340/173 FF
3,636,377 1/1972 Economopoulos ............340/173 FF

*Primary Examiner*—Terrell W. Fears
*Attorney*—Henry Powers, Alvin J. Riddles and J. Jancin Jr.

[57] ABSTRACT

A data storage circuit utilizing a bistable memory cell and a resistor sensing bit switch preamplifier for performing read and write operations. The cell contains two double-emitter semiconductor elements having their bases and collectors cross-coupled to form a bistable circuit. Each element has one emitter connected in common to a resistor terminated word line to permit bilevel conduction of the elements from a low level standby state to a higher level power-up state for access operations. The second emitter of each element is coupled through collector-emitter paths of a pair of amplifying and switching transistors to corresponding ones of resistor terminated bit sense lines. The amplifying transistors are concurrently biased on and off by a gating transistor under selective control of a bit driver decoding circuit. In read operations, the stored data is sensed at the bit sense line resistors by a final sense amplifier.

For write operations, a write driver is provided to provide appropriate voltages at the bit sense line resistor as required for storage of required data in the memory cell. The final sense amplifier is adapted to be isolated from the circuit by connection to the bit lines through the collector-emitter path of a normally forward-biased control transistor which is reverse-biased during write operations.

40 Claims, 4 Drawing Figures

INVENTORS
FREDRICK T. BLOUNT
HENRY A. GELLER
HOWARD LEUNG
SCOTT C. LEWIS
RICHARD D. MOORE
JOSEPH M. REDMOND

BY Henry Powers
ATTORNEY

RESISTOR SENSING BIT SWITCH

FIELD OF THE INVENTION

This invention relates to an information storage system, and more particularly to a data storage circuit utilizing a sensing bit switch/preamplifier between a bistable memory cell and associated output sensing for reading and writing data in storage.

BACKGROUND OF THE INVENTION

In U.S. Pats. No. 3,423,737 and No. 3,537,078, assigned to the same assignee as this application, storage cells are described which are readily adapted for integration into monolithic devices. Such memory cells employ two double-emitter trigger transistors with their bases and collectors cross-coupled to form a bistable circuit. One emitter on each of the trigger transistors is connected in common to a common word line, which in the latter said U. S. Patent is resistor terminated. The other emitter of each of these trigger transistors is connected to a different one of an associated pair of bit lines for reading and writing of data in the storage cell. By adjusting the potential levels at the multi-emitter of these trigger transistors, data stored in the cell can be either read or changed. Although such memory circuit configurations are readily amenable to integration in semiconductor devices, further simplifications of such circuits is desirable to reduce the complexity of drive and sense circuits to not only provide a corresponding reduction in chip areas in which the circuit is formed by monolithic fabrication techniques but also to reduce the required number of components for minimizing power requirements.

SUMMARY OF THE INVENTION

In accordance with this invention, the data storage circuit, inclusive of associated drive and sense circuitry, is modified to provide bidirectional Read/Write data transfer and signal amplification with significant reduction in the required number of transistors and resistors. In addition all voltages required for operation of the circuit are above ground without need of negative voltages. In the circuit of this invention, each uncoupled emitter of the double emitter trigger transistor is connected by its bit line through the collector-emitter path of a corresponding one of a pair of switching transistors to separate resistor terminated sense lines. The voltage levels at the sense lines are connected through separate collector-emitter paths of a pair of isolation transistors to a differential sense amplifier for isolation thereof during write operations. Biasing of these switching transistors on and off is effected under control of a gating transistor which is responsive to bit access signals. Entry of data into the cell is under control of a write circuit connected to the sense lines which provides appropriate voltage at the sense resistor in accordance with data to be stored into the memory cell. In the circuit configuration employed, all voltages employed in operation of the data storage circuit are above ground without need of negative voltages which characterize comparable prior art memory circuits.

Accordingly, it is an object of this invention to provide a novel data storage circuit.

Another object of this invention is to provide a data storage circuit having reduced number of components for facilitating its incorporation into integrated devices.

It is another object of this invention to provide a novel data storage circuit adapted for bidirectional flow of Read/Write data transfer between memory cell and output.

The foregoing and other objects, features and advantages of the invention will be apparent from the following more particular description of the preferred embodiments of the invention as illustrated in the accompanying drawings.

DESCRIPTION OF THE PREFERRED EMBODIMENT

Figure 1:
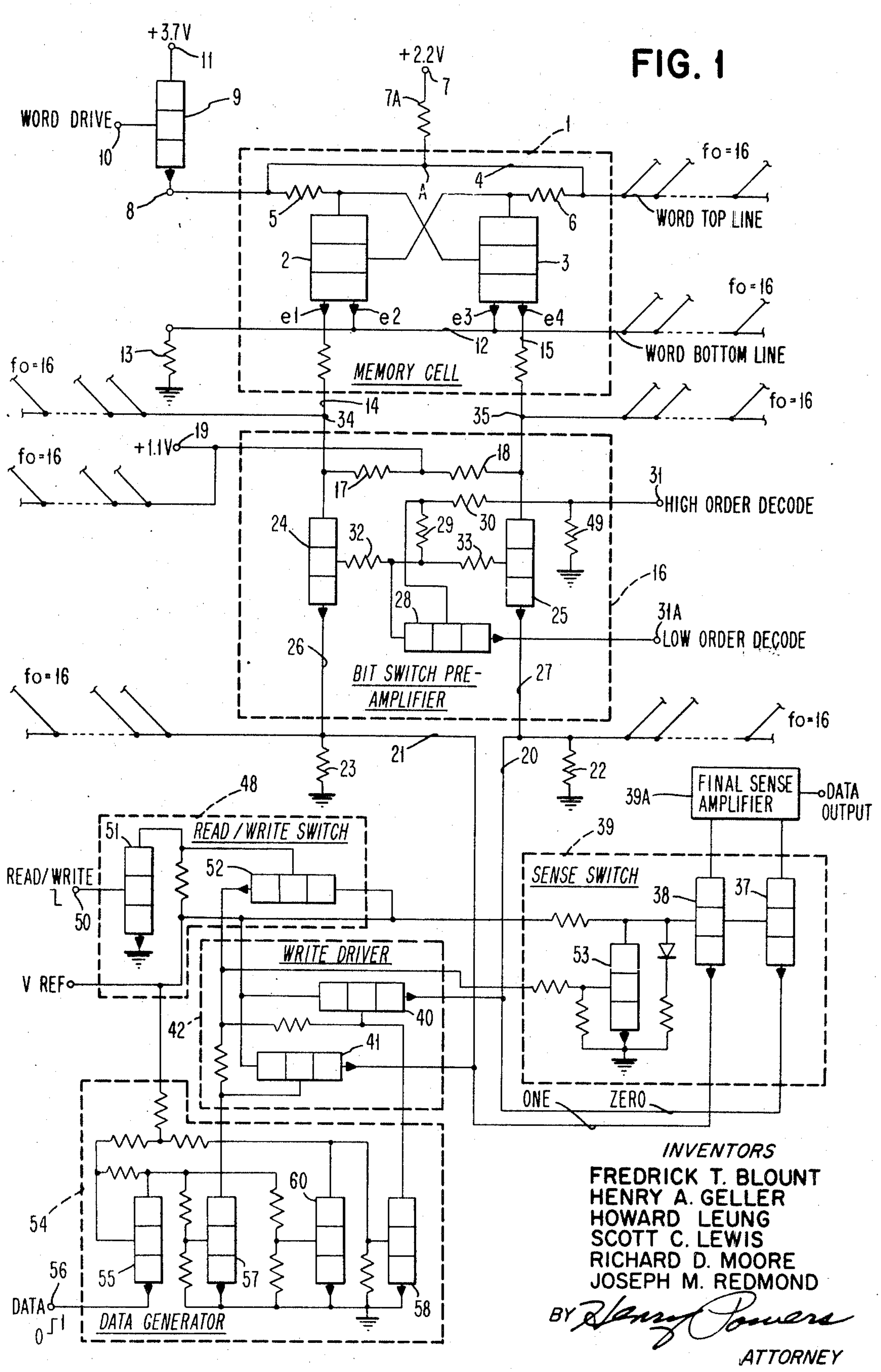
FIG. 1 is a schematic of an embodiment of the data storage circuit of this invention.

Referring to the drawings, a data storage circuit in accordance with this invention is shown in FIG. 1. The storage unit of this embodiment is a memory cell 1 comprised of two double-emitter trigger transistors 2 and 3 having their bases and collectors cross-coupled in a bistable configuration. The collector electrodes of the two transistors 2 and 3 are connected to a word top line 4 through like resistors 5 and 6. In a specific embodiment, the word top line 4 is fanned-out to sixteen like memory cells 1 which have the collector electrodes of their cross-couple transistors, connected in common to the word top line 4. Potential on the word top line 4 is applied in a bi-level voltage mode by connection of the line through a resistor 7A to a standby power terminal 7 and a power gating terminal 8, both operated at positive voltage levels.

The positive voltage level at standby power terminal 7 is normally maintained fixed whereas the positive voltage level at power gating terminal 8 is gated on and off by coupling to the emitter-collector path of a word-drive transistor 9 biased on and off under control of a word drive signal at its base connected terminal 10. In one specific circuit employing a fan-out of sixteen like memory cells from word top line 4, the potential employed at the standby terminal 7 was +2.2 volts, and +3.7 volts at the collector terminal 11 of word-drive transistor 9. During standby, the word-drive transistor 9 is biased-off, and the word top line 4 is powered only from the 2.2 volt supply at standby terminal 7. In the power-up condition, word-drive transistor 9 is biased on by an appropriate word-drive signal at terminal 10 to connect the word top line 4 to both the 2.2 volt and 3.7 volt supplies at the respective terminals 7 and 11.

The memory cell is also coupled to a bottom word line 12 via connection thereto of emitters *e*2 and *e*3 of their respective trigger transistors 2 and 3, with the word bottom line 12 grounded through a word bottom resistor 13. In the specific circuit indicated the word bottom line 12 also has a fan-out of sixteen like memory cells by connection to corresponding emitters of the double-emitter transistor pair in the cells.

The other emitters *e*1 and *e*4 of trigger transistors 2 and 3 also connect the memory cell 1 to bit lines 14 and 15 which are, in turn, connected to a bit switch/preamplifier 16 and through associated like resistors 17 and 18 to the positive terminal 19 of a reference voltage source, which in the specific circuit indicated was +1.1V. As shown, the specific network noted had a fanout to sixteen like bit line pairs 14 and 15 via their associated resistor pair network 17 and 18.

With the biases noted hereto, the memory cell can be conditioned for standby and ready state operation. For purposes of describing the standby operation, it will be assumed that a selected trigger transistor such as 3 is conducting to represent a ZERO binary value and transistor 2 (representing a binary ONE value) will be nonconducting and the word drive transistor 9 will be biased off. In this condition, the collectors of trigger transistor 2 and 3 will be coupled to the 2.2 volt supply at the positive terminal 7 with 0.75 volts applied to the respective collector and base electrodes of transistors 3 and 2, and 0.95 volts applied to the respective collector and base electrodes of transistors 2 and 3. The potential at the respective emitters e1 and e4, of transistors 2 and 3, will be reversed biased with respect to their bases at 1.1 volts via their associated resistors 17 and 18. With transistor 3 conducting via its emitter *e*3, current flows through word bottom resistor 13 with the voltage of word bottom line 12 set at 0.2V, to hold the memory cell 1 in its prOper operating condition. The nominal current through the trigger transistor pair 2 and 3 in each of sixteen fanned-out memory cells along the word line is 146 microamps.

For read state operation, to represent a word-selected/not bit-selected condition, the memory cell is powered up by forward biasing the word-drive transistor 9 by a corresponding signal to its base at word drive terminal 10. This couples the word top line 4 to the positive terminal 11 of the 3.7 volt supply, which will raise the word top line 4 to 2.1 volts. This will bias the conducting transistor 3 collector and base electrodes at 1.2 volts and 1.7 volts, respectively, while concurrently biasing the non-conducting transistors 2 collector and base electrodes at 1.7 volts and 1.2 volts, respectively. With a bias from reference terminal 19 maintained at 1.1 volts at emitter *e*1 and *e*2, the current flow through the conducting trigger transistors in the memory cells (along the word line and through the inner emitters *e*2 or *e*3) will be substantially increased to provide a 1.0 volt drop across word bottom resistor 13 from ground to the bottom word line 12. In the power up condition, with one memory cell assumed accessed, the selected word line of sixteen fanned-out memory cells will receive nOminally 10 milliamps with most of the current flowing through the fifteen unselected cells and into the word bottom resistor 13.

The bit line 14 and 15 are selectively coupled by meanS of the bit switch/preamplifier circuit (transfer circuit) 16 to corresponding ones of a pair of sense/write lines 21 and 20 which are terminated to ground by respective sense resistors 23 and 22. ThiS transfer circuit 16 comprises two transistors 24 and 25 with collector-emitter paths of transistor 24 coupled to bit line 14 and, via access line 26, to write/sense line 21. Similarly, the collector-emitter path of transistor 25 is coupled to bit line 15 and, via access line 27, to write/sense line 20. Included within transfer circuit is a decode-gate transistor 28 for controlling the conducting states of bit line transistors 21 and 25. This gate transistor 28 has its emitter-collector path connected between a low order decode terminal 31A and through a series resistor path network 29 and 30 to a high order decode terminal 31. The necessary biasing of gate transistor 28 is completed by coupling of its base to the common of the resistor series network 29 and 30. The gate transistor 28 controls switching of bit transistors 24 and 25 by coupling of their bases through like respective resistors 32 and 33 to the collector electrode of gate transistor 28.

In the embodiment described a transfer circuit or bit switch 16 is designed to service one column of a sixteen by sixteen matrix of memory cells 1. To this end, the corresponding bit lines of a column of sixteen memory cells 1 are fanned-in in common to respective terminals 34 and 36 which are inputted to the bit switch circuit 16. As will be understood there will be an individual bit switch circuit 16 for corresponding ones of the sixteen columns in the 16 × 16 matrix of memory cells.

Figure 2:
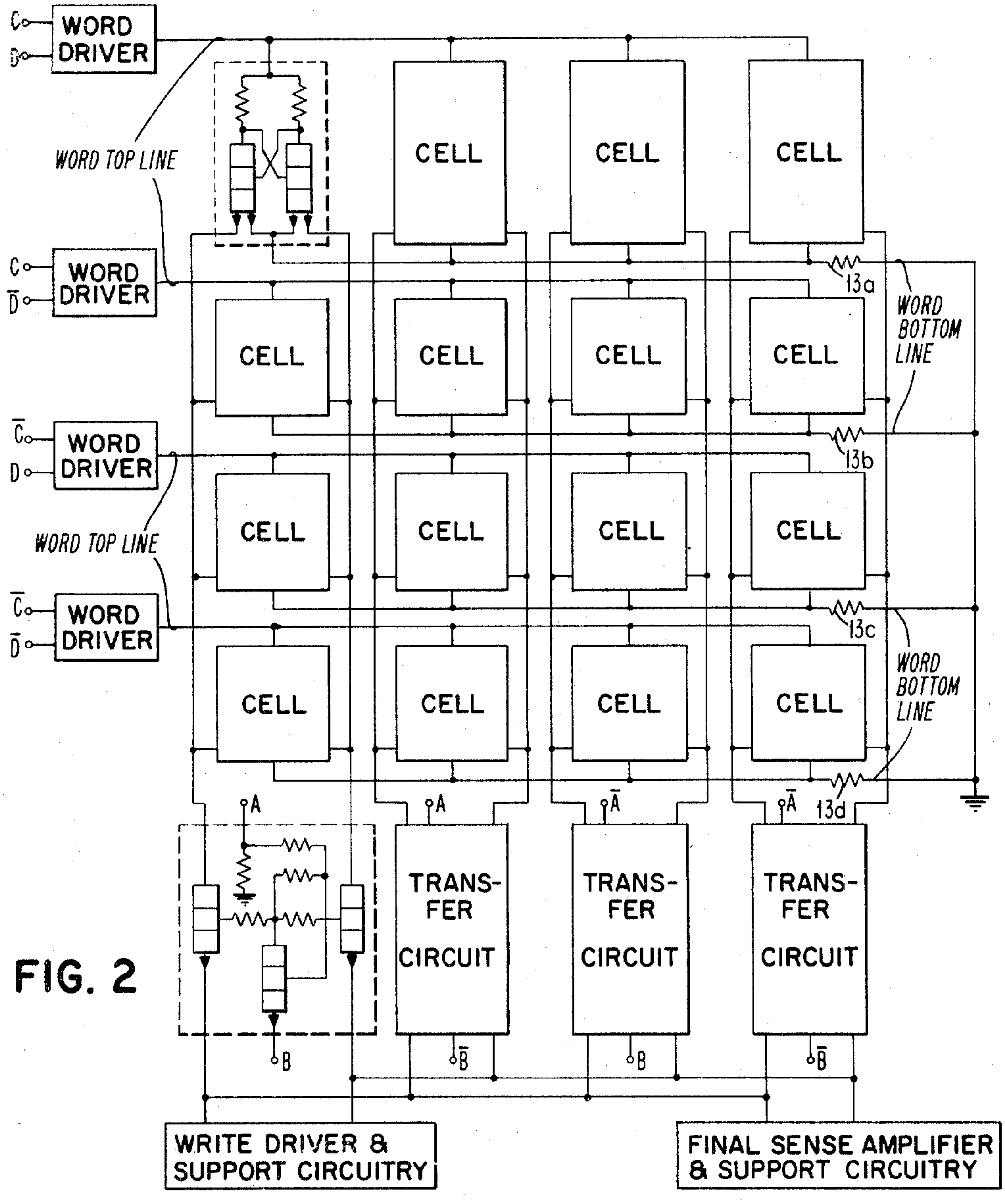
FIG. 2 is a schematic illustrating how the data storage circuit of FIG. 1 can be embodied in a memory array.
Figure 3:
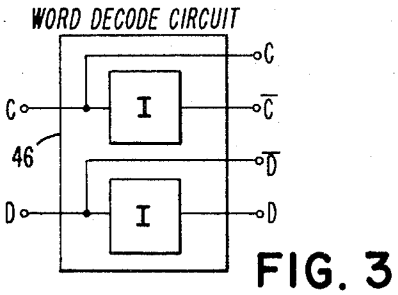
FIGS. 3 and 4 show logic circuits illustrative of decode and drive unit controls for memory cell selection in the memory matrix of FIG. 2.
Figure 4:
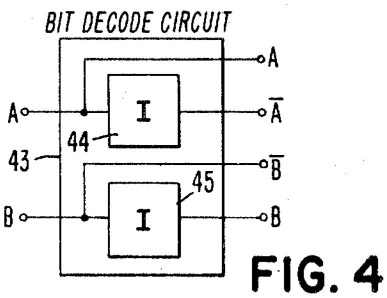

As will be observed, in order to turn on gate transistor 28 concurrent application of High and Low order decode signals is required at the respective terminals 31 and 31A in accordance with decode logic used. Illustrative logic 43 is shown in FIG. 4 as representative of the decode units that may be used for selection of transfer circuits 16 along bit columns of a 4 × 4 matrix (simplified for purposes of discussion) of memory cells 1 as shown in FIG. 2. In this circuit logic signals A and B are inputted to respective inverters 44 and 45 to provide tapped-off A and B signal levels in conjunction with inverted $\bar{A}$ and $\bar{B}$ signal levels. Selected combination of the inputted A and B logic signals with a corresponding combination of AB, AB, AB, or AB signals are specific to the transfer circuit 16 having corresponding inputs. A similar logic circuit 46 is shown in FIG. 3 for controlling the word drive 47 shown in FIG. 2 in response to logic signals C and D which determines the word line or row to be selected.

The data status of sense/write lines in read operation can be readily sensed by conventional read-out units, such as a differential final sense amplifier 37, and compared to see if a binary ZERO or ONE is stored in the cell. This final sense amplifier 37 is coupled to sense lines 20 and 21 through corresponding collector-emitter paths of respective cascode stage transistors 37 and 38 of a sense switch circuit 39 under control of read/write switch 48 and which serves to isolate the sense amplifier 37 from the sense lines 20 and 21 during write operations.

Writing of data is effected by means of controlled selection of the conduction of write transistors 40 and 41 of a write driver 42 under control of the READ/WRITE switch 48 and data generator 54. For example with write transistor 40 on and its corresponding transistor 41 off, the sense line 20 will be driven high across its sense resistor 22 with sense line 21 unaffected while, concurrently, the cascode transistor stage 37 and 38 will be disabled. When the word top and bottom lines 4 and 12 are powered up in conjunction with gating on of the transfer circuit transistors 24 and 25, the status of the up-sense line 20 and down-sense line 21 will be sensed on trigger transistor 2 and 3 which in this write status will reverse bias emitter e4 and forward bias emitter e2 to switch conduction through transistor 2 for a binary ONE storage in memory cell 1. As will be understood powering-up of sense line 21, during the described write operation, will constrain conduction in trigger transistor 3 for a binary ZERO storage in memory cell 1.

Consolidating the foregoing discussion, it is noted that current in both word top and bottom lines 4 and 12 associated with memory cells 1, along a word line, will flow from left to right during standby and power-up to insure a constant drop across each memory cell 1.

During a nominal standby current of 146 microamps from the 0.95 volts at terminal 7 flows through the cells 1 and then the word bottom resistors 13.

In power-up with an UP-word drive signal applied at terminal 10, of a selected word line (e.g. in a 16 × 16 cell matrix version of the 4 × 4 array shown in FIG. 2), transistor 9 is turned-on to raise the associated word top line 4 to 2.1 volts from the 3.7 volt supply at terminal 11. Most of a nominal current of 10ma will flow through the fifteen unselected cells and into the word bottom resistor 13 creating a drop across the resistor of 1.1 volts. Where the selected bit line pairs 14 and 15 have been lowered from about 1.15 to about 0.4 volts, the power-up voltage rise in the bottom word line 12 forces the cell current, in the selected cell, into one of the lowered bit lines 14 or 15 through either one of outside emitters e1 or e4 in accordance with the conducting ones of trigger transistors 2 and 3.

For selection of a memory cell, its associated bit line pair 14 and 15, normally biased at 1.15 volts, are connected to their respective sense lines 21 and 20 by saturating their associated bit switch transistors 24 and 25. In the beginning of a read operation, conduction of the bit lines 14 and 15 will be discharged through one of the bit switch transistors 24 and 25, respectively, one of the sense lines 21 or 20, respectively, and one of the sense resistors 23 or 22, respectively, down to about 0.4 volts. The sense lines 21 or 20 will not drop below 0.25 volts due to the clamping action of transistors 37 and 38 in sense switch circuit 39.

In addition to base current and restore resistor current (e.g. resistors 17 and 18), one of the bit switch transistors 24 or 25 also has the selected memory cell current flowing through its emitter. The difference in the transistor 24 and 25 emitter currents is the signal input to the final sense differential amplifier 37, through matched cascode stage transistors 37 and 38.

After either a read or write operation the bit switch transistors 24 and 25 are turned off partly by an off-drive provided by resistor 49. During recovery, the bit lines 14 and 15 are returned to 1.15 volts by resistors 17 and 18 and 1.1 volt supply at terminal 19.

For a write operation, one of sense lines 20 and 21 is forced quickly to 1.0 volts. Transistors 37 and 38, in sense switch 39, are both disabled by a down READ/WRITE signal at terminal 50 at the READ/WRITE switch 48. This will allow the other of sense lines 20 and 21 to drop to ground if no current is provided to its sense resistor (either sense resistor 22 or 23). When the high and low order decode signals arrive at their respective terminals 31 and 31A, one of bit switch transistors 24 and 25 cannot turn-on due to the high sense line voltage seen by its emitters. As a result all of the current through resistors 29 and 30 will flow into the base of the other of bit switch transistors 24 and 25, saturating it. The conducting one of bit lines 14 and 15, connected through its bit switch transistor and sense resistor to ground, quickly discharges toward 0.4 volts. With one of bit lines 14 and 15 left at 1.15 volts, in conjunction with word top and bottom voltages rising to 2.2 volts and 1.1 volts, respectively, the current in the conducting memory trigger transistor is forced into the pulled-down one of bit lines 14 and 15.

The reading and entry of data in memory cell 1 is controlled by the READ/WRITE switch 48. As part of the READ/WRITE switch 48, circuitry is included which disables the final sense amplifier 37 during a write operation.

For a read operation, the READ/WRITE signal is high at terminal 50 to forward bias transistor 51 into saturation which holds transistor 52 off. This accomplishes two things. First, it insures that both of write driver transistors 40 and 41 are off, so that the sense lines 20 and 21 are affected only by data signals from their respective bit lines 15 and 14. Also it insures that the sense amplifier gating transistor 53 is off so that the final sense amplifier 37 is on. In addition, since write driver transistors 40 and 41 are off, the action of the data generator 54 does not affect circuit operations.

For a write operation, the READ/WRITE signal is inputted low to the terminal 50 of READ/WRITE switch 48. This means that transistor 51 is off which turns transistor 52 on, so that transistors 40 and 41 (of Write Driver 42) can both be on. However, only one of the write driver transistors 40 and 41 is actually turned on, due to the operation of data generator 54. If the emitter of transistor 55 is up, due to an up binary ONE signal at the data generator terminal 56, transistor 57 is on, and the base of the write driver transistor 41 is held too low for it to turn on, which in turn holds sense line 21 down.

Concurrently, when the emitter of transistor 55 is up, transistor 60 is on to hold transistor 58 off which raises the base of transistor 40 to turn it on driving the binary ZERO sense line 20 high through its sense resistor 22. As a result, the emitter of a bit switch transistor 25 is high to reverse bias it, and constrain conduction in transistor 24 to store the binary ONE in trigger transistor 20 of the memory cell 1.

If the emitter of transistor 55 is down, by a down binary ZERO signal at terminal 56, transistor 60 is turned off so that transistor 58 is turned on to hold transistor 40 off which in turn holds sense line 20 down.

Concurrently, when the emitter of transistor 55 is down, transistor 57 is turned off to switch transistor 41 on. As a result, sense line 21 is driven high through its sense resistor 23, to raise the emitter of transistor 24 up to switch it off. Thus trigger transistor 25 stores a binary ZERO in the trigger transistor of memory cell 1. Thus only one of sense lines 20 and 21 is driven high, and a write operation is accomplished. It is to be noted that during this time, transistor 53 is off to disable final sense amplifier 39 by reverse biasing of the cascode stage transistors 37 and 38.

While the invention has been particularly shown and described with reference to the preferred embodiments thereof, it will be understood by those skilled in the art that various changes in form and details may be made therein without departing from the spirit and scope of the invention.

What is claimed is:

1. A data storage circuit comprising

A. a memory storage cell having a first access means at which data is to be read and stored in said cell;

B. readout means for a. indicating the state of said memory cell during read operation, and b. having a second access means;

C. a transistor; third and fourth access means having the emitter-collector path of said transistor connected therebetween.

D. first coupling means for electrically connecting said first and third access means;

E. second coupling means for electrically connecting said second and fourth access means;

F. control means coupled to the base of said transistor for forward biasing of said transistor during reading and writing of data in said cell, and reverse biasing of said transistor when said cell is not accessed;

G. data input means coupled to said fourth access means for controlling storage of data in said cell during write operation.

2. The circuit of claim 1 wherein said control means comprises:

A. a second transistor having a collector-emitter path connected in series with a resistive network between first and second control terminals;

B. means coupling the base of the first said transistor to an intermediate point on said resistive network to bias the first said transistor on and off when said second transistor is forward and reverse biased, respectively; and C. first and second signal sources to apply corresponding first and second control signals to a respective one of said first and second control terminals whereat said first and second control signals are applied concurrently at levels sufficient to forward-bias said second transistor with reverse-bias thereof in the absence of concurrent application of both said first and second control signals.

3. The circuit of claim 1 including load means coupled to said fourth access means and responsive to said data input means and said transistor for generating voltage levels corresponding to the status and entry of data in said storage cell.

4. The circuit of claim 3 wherein said control means comprises:

A. a second transistor having a collector-emitter path connected in series with a resistive network between first and second control terminals;

B. means coupling the base of the first said transistor to an intermediate point on said resistive network to bias the first said transistor on and off when said second transistor is forward and reverse biased, respectively; and C. first and second signal sources to apply corresponding first and second control signals to a respective one of said first and second control terminals whereat said first and second control signals are applied concurrently at levels sufficient to forward-bias said second transistor with reverse-bias thereof in the absence of concurrent application of both said first and second control signals.

5. The circuit of claim 3 wherein said second coupling means comprises a normally forward-biased second transistor having an emitter-collector path connected between said second and fourth access means, and second control means coupled to the base of said second transistor for reverse-biasing thereof to isolate said readout means from said fourth access means during write operation when a desired data state is to be stored in said memory cell.

6. The circuit of claim 5 wherein the first said control means comprises:

A. a third transistor having a collector-emitter path connected in series with a resistive network between first and second control terminals;

B. means coupling the base of the first said transistor to an intermediate point on said resistive network to bias the first said transistor on and off when said third transistor is forward and reverse biased, respectively; and C. first and second signal sources to apply corresponding first and second control signals to a respective one of said first and second control terminals whereat said first and second control signals are applied concurrently at levels sufficient to forward-bias said third transistor with reverse-bias thereof in the absence of concurrent application of both said first and second control signals.

7. The circuit of claim 5 wherein said data input means comprises a normally reverse-biased third transistor having an emitter-collector path connected between a reference potential and said fourth access means, and third control means coupled to the base of said third transistor for control of the bias thereof during write operations in accordance with the data status to be stored in said memory cell.

8. The circuit of claim 7 wherein the first said control means comprises:

A. a fourth transistor having a collector-emitter path connected in series with a resistive network between first and second control terminals;

B. means coupling the base of the first said transistor to an intermediate point on said resistive network to bias the first said transistor on and off when said fourth said transistor is forward and reverse biased, respectively; and C. first and second signal sources to apply corresponding first and second control signals to a respective one of said first and second control terminals whereat said first and second control signals are applied concurrently at levels sufficient to forward-bias said fourth transistor with reverse-bias thereof in the absence of concurrent application of both said first and second control signals.

9. A data storage circuit comprising:

A. a flip-flop memory circuit means having first and second output means each of which may assume a different one of two selected potentials to represent a unit of data;

B. a pair of first and second transistors with the emitter-collector path of said first transistor coupled between said first output means and a first access means, and with the emitter-collector path of said second transistor connected between said second output means and a second access means;

C. control means coupled to the bases of said first and second transistor for simultaneous a. forward biasing each thereof during read and writer operations; and b. reverse biasing each thereof when said memory cell is not accessed;

D. readout means for a. indicating the state of said memory circuit during read operation; and b. having input means connected to said first and second access means;

E. data input means coupled to said first and second access means for controlling storage of data in said memory means during write operations.

10. The circuit of claim 9 wherein said control means comprises:

A. a third transistor having a collector-emitter path connected in series with a resistive network between first and second control terminals;

B. means coupling the bases of the first and second transistors to an intermediate point on said resistive network to concurrently bias both said first and second transistors on and off when said third transistor is forward and reverse biased, respectively; and C. first and second signal sources to apply corresponding first and second control signals to al respective one of said first and second control terminals whereat said first and second control signals are applied concurrently at levels sufficient to forward-bias said third transistor with reverse-bias thereof in the absence of concurrent application of both said first and second control signals.

11. The circuit of claim 9 including first and second load means coupled to respective ones of said first and second access means, with said first and second load means responsive to said data input means and corresponding ones of said first and second transistors for generating voltage levels corresponding to the status and entry of data in said memory means.

12. The circuit of claim 11 wherein said control means comprises:

A. a third transistor having a collector-emitter path connected in series with a resistive network between first and second control terminals;

B. means coupling the bases of the first and second transistors to an intermediate point on said resistive network to concurrently bias both said first and second transistors on and off when said third transistor is forward and reverse biased, respectively; and C. first and second signal sources to apply corresponding first and second control signals to a respective one of said first and second control terminals whereat said first and second control signals are applied concurrently at levels sufficient to forward-bias said third transistor with reverse-bias thereof in the absence of concurrent application of both said first and second control signals.

13. The circuit of claim 11 including:

A. a third transistor having its emitter-collector path connected in series between said readout input means and said first access means;

B. a fourth transistor having its emitter-collector path connected in series between said readout input means and said second access means, and C. second control means coupled to the bases of said third and fourth transistors for concurrent reverse-biasing each thereof to isolate said readout means during write operations.

14. The circuit of claim 13 wherein the first said control means comprises:

A. a fifth transistor having a collector-emitter path connected in series with a resistive network between first and second control terminals;

B. means coupling the base of said first and second transistors to an intermediate point on said resistive network to concurrently bias both said first and second transistors on and off when said fifth transistor is forward and reverse biased, respectively; and C. first and second signal sources to apply corresponding first and second control signals to a respective one of said first and second control terminals whereat said first and second control signals are applied concurrently at levels sufficient to forward-bias said fifth transistor with the reverse-bias thereof in the absence of concurrent application of both said first and second control signals.

15. The circuit of claim 13 wherein said data input means comprise fifth and sixth transistors, with the emitter-collector path of said fifth transistor connected between a reference potential and said first access means, and with the emitter-collector path of said sixth transistor connected between said source of potential and said second access means; and third control means coupled to the bases of said fifth and sixth transistors for selective biasing thereof in accordance with the required data status to be stored in said memory means.

16. The circuit of claim 15 wherein the first said control means comprises:

A. a seventh transistor having a collector-emitter path connected in series with a resistive network between first and second control terminals;

B. means coupling the bases of said first and second transistors to an intermediate point on said resistive network to concurrently bias both said first and second transistors on and off when said seventh transistor is forward and reverse biased, respectively; and C. first and second signal sources to apply corresponding first and second control signals to a respective one of said first and second control terminals whereat said first and second control signals are applied concurrently at levels sufficient to forward-bias said seventh transistor with reverse-bias thereof in the absence of concurrent application of both said first and second control signals.

17. The circuit of claim 9 wherein said memory means comprises a memory cell of third and fourth transistors having the collectors and bases thereof cross-coupled to form a bistable circuit with A. the emitter-collector path of said third transistor connected in series with said first output means; and B. the emitter-collector of said fourth transistor connected in series with said second output means; and source means biasing said third and fourth transistors for bistable operation.

18. The circuit of claim 17 wherein the first said control means comprises

A. a fifth transistor having a collector-emitter path connected in series with a resistive network between first and second control terminals;

B. means coupling the bases of said first and second transistors to an intermediate point on said resistive network to concurrently bias both said first and second transistors on and off when said fifth transistor is forward and reverse biased, respectively; and C. first and second signal sources to apply corresponding first and second control signals to a respective one of said first and second control terminals whereat said first and second control signals are applied concurrently at levels sufficient to forward-bias said fifth transistor with reverse-bias thereof in the absence of concurrent application of both said first and second control signals.

19. The circuit of claim 17 including first and second load means coupled to respective ones of said first and second access means, with said first and second load means responsive to said data input means and corresponding ones of said first and second transistors for generating voltage levels corresponding to the status and entry of data in said memory cell.

20. The circuit of claim 19 wherein the first said control means comprises:

A. a fifth transistor having a collector-emitter path connected in series with a resistive network between first and second control terminals;

B. means coupling the base of said first and second transistors to an intermediate point on said resistive network to concurrently bias both said first and second transistors on and off when said fifth transistor is forward and reverse biased, respectively; and C. first and second signal sources to apply corresponding first and second control signals to a respective one of said first and second control terminals whereat said first and second control signals are applied concurrently at levels sufficient to forward-bias said fifth transistor with reverse-bias thereof in the absence of concurrent application of both said first and second control signals.

21. The circuit of claim 19 including

A. a fifth transistor having its emitter-collector path connected in series between said readout input means and said first access means;

B. a sixth transistor having its emitter-collector path connected in series between said readout input means and said second access means; and C. second control means coupled to the bases of said fifth and sixth transistors for concurrent reverse-biasing each thereof to isolate said readout means during write operations.

22. The circuit of claim 21 wherein the first said control means comprises:

A. a seventh transistor having a collector-emitter path connected in series with a resistive network between first and second control terminals;

B. means coupling the base of said first and second transistor to an intermediate point on said resistive network to concurrently bias both said first and second transistors on and off when said seventh transistor is forward and reverse biased, respectively; and C. first and second signal sources to apply corresponding first and second control signals to respective ones of said first and second control terminals whereat said first and second control signals are applied concurrently at levels sufficient to forward-bias said seventh transistor with reverse-bias thereof in the absence of concurrent application of both said first and second control signals.

23. The circuit of claim 21 wherein said data input means comprise seventh and eighth transistors, with the emitter-collector path of said seventh transistor connected between a reference potential and said first access means, and with the emitter-collector path of said eighth transistor connected between said source of potential and said second access means; and third control means coupled to the bases of said seventh and eighth transistors for selective biasing thereof to provide required voltage levels at said load means with the required data status of said memory means.

24. The circuit of claim 23 wherein the first said control means comprises:

A. a ninth transistor having a collector-emitter path connected in series with a resistive network between first and second control terminals;

B. means coupling the bases of both said first and second transistor to an intermediate point on said resistive network to concurrently bias both said first and second transistors on and off when said ninth transistor is forward and reverse biased, respectively; and C. first and second signal sources to apply corresponding first and second control signals to respective ones of said first and second control terminals whereat said first and second control signals are concurrently applied at sufficient levels to forward-bias said ninth transistor with reverse-bias thereof in the absence of concurrent application of both said first and second control signals.

25. The circuit of claim 9 wherein said memory means comprises a memory cell of third and fourth multiemitter trigger transistors having the collectors and bases thereof crossed-coupled to form a bistable circuit with A. first emitters of said trigger transistors connected together, and B. second emitters of said trigger transistors coupled to a corresponding one of said first and second output means, and C. bilevel source means providing a first standby potential level and a second access potential level across said trigger transistors with said first potential level in conjunction with the reverse bias of said first and second transistors a. forward-biasing a said first emitter on a data storage controlled conducting one of said trigger transistors with respect to the corresponding base thereof, and b. reverse-biasing a second emitter of the data storage controlled conducting trigger transistor with respect to the base thereof, with said second potential level a. in conjunction with the reverse-bias of said first and second transistors during power-up of said memory cell i. forward-biasing said second emitter of the data storage controlled conducting trigger transistor with respect to the base thereof and ii. increasing the forward-bias on said first emitter of said conducting trigger transistor with respect to the base thereof to a level providing major conduction of the data storage controlled conducting transistor through its said first emitter relative to the second emitter thereof, b. in conjunction with said first and second transistors during access operations forward-biasing a said second emitter of the data storage controlled conducting trigger transistor relative to the base thereof to a level switching major conduction of said conducting trigger transistor through said second emitter with respect to the first emitter thereof, and c. in conjunction with said first and second transistors and with said data input means during write operations, providing conducting forward-bias on a said second emitter of a selected corresponding one of said trigger transistors relative to the base thereof; and D. second control means for selecting said first potential level during stand-by operations and said second potential level during power-up and access operations.

26. The circuit of claim 25 wherein said bilevel source means includes:

A. a like-resistor pair network coupled between the second emitters of said trigger transistors; and B. a complementary source means coupled to said network between its resistor pair to a. reverse-bias said second emitters with respect to their respective bases of said trigger transistors during said standby operation, b. maintaining during ready state operation i. reverse-bias on a said second emitter of the data storage control non-conducting one of said trigger transistors while ii. providing forward-bias on a said second emitter of a data storage control conducting one of said trigger transistors to a level providing major conduction of the data storage control conduction one of said trigger transistors through its said first emitter relative to the second emitter thereof, and c. in conjunction with said bilevel source means during access operation forward-biasing a second emitter of the data storage control conducting one of said trigger transistors to a level switching major conduction of said data storage control conducting trigger transistors through its said second emitter relative to the first emitter thereof.

27. The circuit of claim 25 wherein the first said control means comprises:

A. a fifth transistor having a collector-emitter path connected in series with a resistive network between first and second control terminals;

B. means coupling the bases of said first and second transistors to an intermediate point on said resistive network to concurrently bias both the said first and second transistors on and off when said fifth transistor is forward and reverse biased, respectively; and C. first and second signal sources to apply corresponding first and second control signals to a respective one of said first and second control terminals whereat said first and second control signals are applied concurrently at levels sufficient to forward-bias said fifth transistor with reverse bias thereof in the absence of concurrent application of both said first and second control signals.

28. The circuit of claim 27 wherein said bilevel source means includes:

A. a second like-resistor pair network coupled between the second emitters of said trigger transistors; and B. a complementary source means coupled to said network between its resistor pair to a. reverse-bias second emitters with respect to their respective bases of said trigger transistors during said standby operation, b. maintaining during read state operation i. reverse-bias on a said second emitter of the data storage control non-conducting one of said trigger transistors while ii. providing forward-bias on a said second emitter of a data storage control conducting one of said trigger transistors to a level providing major conduction of the data storage control conducting one of said trigger transistors through its said first emitter relative to the second emitter thereof, and c. in conjunction with said bilevel source means during access operation forward-biasing a second emitter of the data storage control conducting one of said trigger transistors to a level switching major conduction of said data storage control conducting trigger transistors through its said second emitter relative to the first emitter thereof.

29. The circuit of claim 25 including first and second load means coupled to respective ones of said first and second access means, with said first and second load means responsive to said data input means and corresponding ones of said first and second transistors for generating voltage levels corresponding to the status and entry of data in said memory means.

30. The circuit of claim 29 wherein said bilevel source means includes:

A. a like-resistor pair network coupled between the second emitters of said trigger transistors; and B. a complementary source means coupled to said network between its resistor pair to a. reverse-bias said second emitters with respect to their respective bases of said trigger transistors during said standby operation, b. maintaining during ready state operation i. reverse-bias on a said second emitter of the data storage control non-conducting one of said trigger transistors while ii. providing forward-bias on a said second emitter of a data storage control conducting one of said trigger transistors to a level providing major conduction of the data storage control conducting one of said trigger transistors through its said first emitter relative to the second emitter thereof, and c. in conjunction with said bilevel source means during access operation forward-biasing a second emitter of the data storage control conducting one of said trigger transistors to a level switching major conduction of said data storage control conducting trigger transistors through its said second emitter relative to the first emitter thereof.

31. The circuit of claim 29 wherein the first said control means comprises:

A. a fifth transistor having a collector-emitter path connected in series with a resistive network between first and second control terminals;

B. means coupling the bases of said first and second transistors to an intermediate point on said resistive network to concurrently bias both the said first and second transistors on and off when said fifth transistor is forward and reverse biased, respectively; and C. first and second signal sources to apply corresponding first and second control signals to a respective one of said first and second control terminals whereat said first and second control signals are applied concurrently at levels sufficient to forward-bias said fifth transistor with reverse bias thereof in the absence of concurrent application of both said first and second control signals.

32. The circuit of claim 31 wherein said bilevel source means includes:

A. a second like-resistor pair network coupled between the second emitters of said trigger transistors; and B. a complementary source means coupled to said network between its resistor pair to a. reverse-bias said second emitters with respect to their respective bases of said trigger transistors during said standby operation, b. maintaining during ready state operation i. reverse-bias on a said second emitter of the data storage control non-conducting one of said trigger transistors while ii. providing forward-bias on a said second emitter of the data storage control conducting one of said trigger transistors to a level providing major conduction of the data storage control conducting one of said trigger transistors through its said first emitter relative to the second emitter thereof, and c. in conjunction with said bilevel source means during access operation forward-biasing a second emitter of the data storage control conducting one of said trigger transistors to a level switching major conduction of said data storage control conducting trigger transistors through its said second emitter relative to the first emitter thereof.

33. The circuit of claim 29 including:

A. a fifth transistor having its emitter-collector path coupled in series between said readout input means and said first access means;

B. a sixth transistor having its emitter-collector path coupled in series between said readout input means and said second access means; and C. third control means coupled to the bases of said fifth and sixth transistors for concurrent reverse-biasing each thereof to isolate said readout means during write operations.

34. The circuit of claim 33 wherein said bilevel source means includes

A. a like-resistor pair network coupled between the second emitters of said trigger transistors; and B. a complementary source means coupled to said network between its resistor pair to a. reverse-bias said second emitters with respect to their respective bases of said trigger transistors during said standby operation, b. maintaining during ready state operation i. reverse-bias on a said second emitter of the data storage control non-conducting one of said trigger transistors while ii. providing forward-bias on a said second emitter of a data storage control conducting one of said trigger transistors to a level providing major conduction of the data storage control conducting one of said trigger transistors through its said first emitter relative to the second emitter thereof, and c. in conjunction with said bilevel source means during access operation forward-biasing a second emitter of the data storage control conducting one of said trigger transistors to a level switching major conduction of said data storage control conducting trigger transistors through its said second emitter relative to the first emitter thereof.

35. The circuit of claim 33 wherein the first said control means comprises:

A. a seventh transistor having a collector-emitter path connected in series with a resistive network between first and second control terminals;

B. means coupling the bases of said first and second transistors to an intermediate point on said resistive network to concurrently bias both said first and second transistors on and off when said seventh transistor is forward and reverse biased, respectively; and C. first and second signal sources to apply corresponding first and second control signals to a respective one of said first and second control terminals whereat said first and second control signals are applied concurrently at sufficient levels to forward-bias said seventh transistor with reverse-bias thereof in the absence of concurrent application of both said first and second control signals.

36. The circuit of claim 35 wherein said bilevel source means includes:

A. a second like-resistor pair network coupled between the second emitters of said trigger transistors; and B. a complementary source means coupled to said network between its resistor pair to a. reverse-bias said second emitters with respect to their respective bases of said trigger transistors during said standby operation, b. maintaining during ready state operation i. reverse-bias on a said second emitter of the data storage control non-conducting one of said trigger transistors while ii. providing forward-bias on a said second emitter of a data storage control conducting one of said trigger transistors to a level providing major conduction of the data storage control conducting one of said trigger transistors through its said first emitter relative to the second emitter thereof, and c. in conjunction with said bilevel source means during access operation forward-biasing a second emitter of the data storage control conducting one of said trigger transistors to a level switching major conduction of said data storage control conducting trigger transistors through its said second emitter relative to the first emitter thereof.

37. The circuit of claim 33 wherein said data input means comprise seventh and eighth transistors, with the emitter-collector path of said seventh transistor coupled between a reference potential and said first access means, and with the emitter-collector path of said eighth transistor coupled between said source of potential and said second access means; and fourth control means coupled to the bases of said seventh and eighth transistors for selective biasing thereof in accordance with the required data status of said memory cell.

38. The circuit of claim 37 wherein said bilevel source means includes:

A. a like-resistor pair network coupled between the second emitters of said trigger transistors; and B. a complementary source means coupled to said network between its resistor pair to a. reverse-bias said second emitters with respect to their respective bases of said trigger transistors during said standby operation, b. maintaining during ready state operation i. reverse-bias on a said second emitter of the data storage control non-conducting one of said trigger transistors while ii. providing forward-bias on a said second emitter of a data storage control conducting one of said trigger transistors to a level providing major conduction of the data storage control conducting one of said trigger transistors through its said first emitter relative to the second emitter thereof, and c. in conjunction with said bilevel source means during access operation forward-biasing a second emitter of the data storage control conducting one of said trigger transistors to a level switching major conduction of said data storage control conducting trigger transistors through its said second emitter relative to the first emitter thereof.

39. The circuit of claim 37 wherein the first said control means comprises:

A. a ninth transistor having a collector-emitter path connected in series with a resistive network between first and second control terminals;

B. means coupling the bases of said first and second transistors to an intermediate point on said resistive network concurrently to bias both said first and second transistors on and off when said ninth transistor is forward and reverse biased, respectively; and C. first and second signal sources to apply corresponding first and second control signals to a respective one of said first and second control terminals whereat said first and second control signals are applied concurrently at sufficient levels to forward-bias said ninth transistor on with reverse bias thereof in the absence of concurrent application of both said first and second control signals.

40. The circuit of claim 39 wherein said bilevel source means includes

A. a second like-resistor pair network coupled between the second emitters of said trigger transistors; and B. a complementary source means coupled to said network between its resistor pair to a. reverse-bias said second emitters with respect to their respective bases of said trigger transistors during said standby operation, b. maintaining during ready state operation i. reverse-bias on a said second emitter of the data storage control non-conducting one of said trigger transistors while ii. providing forward-bias on a said second emitter of a data storage control conducting one of said trigger transistors to a level providing major conduction of the data storage control conducting one of said trigger transistors through its said first emitter relative to the second emitter thereof, and c. in conjunction with said bilevel source means during access operation forward-biasing a second emitter of the data storage control conducting one of said trigger transistors to a level switching major conduction of said data storage control conducting trigger transistors through its said second emitter relative to the first emitter thereof.

* * * * *